Patented Jan. 6, 1931

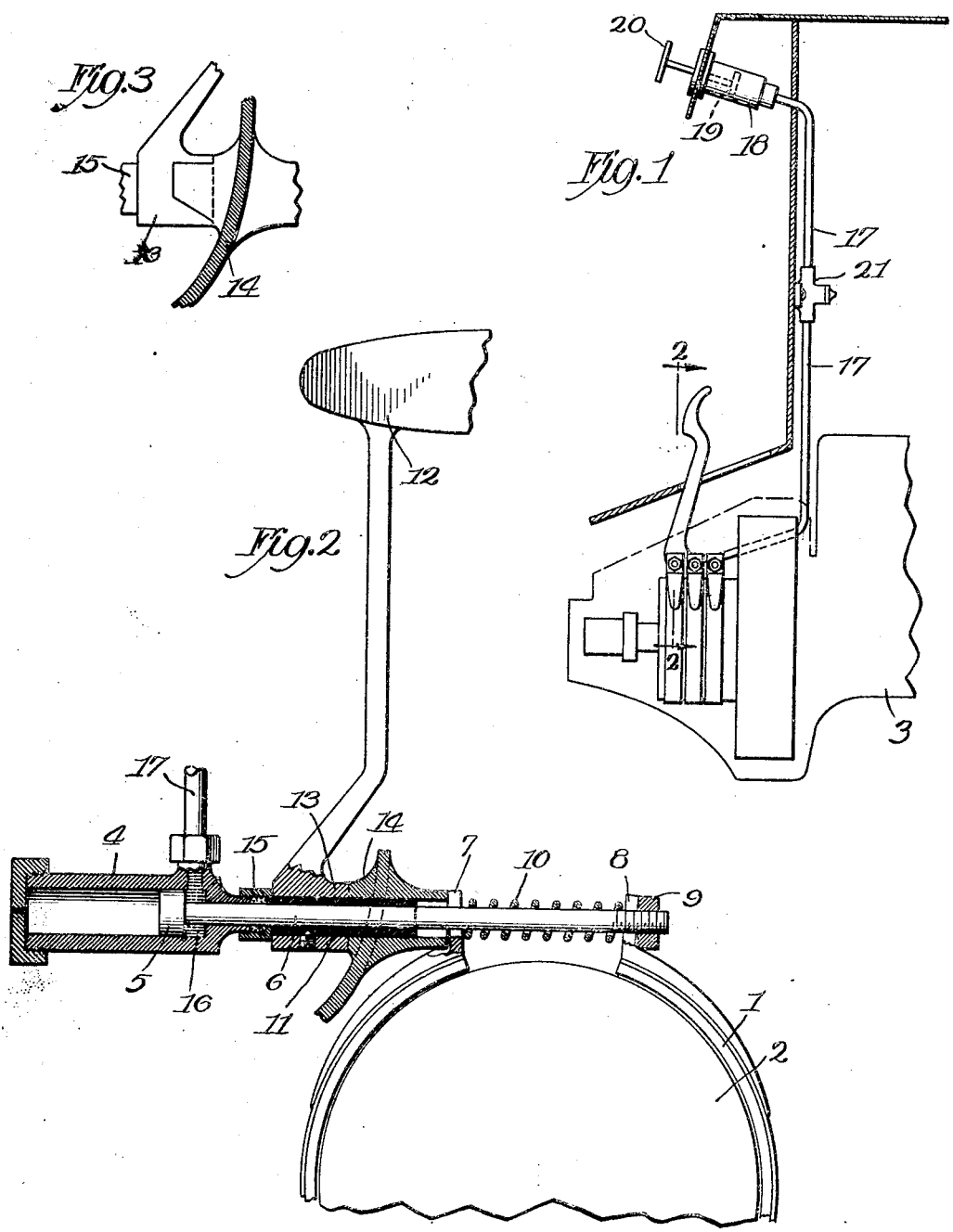

1,787,429

UNITED STATES PATENT OFFICE

RAY H. FLOYD, OF CHICAGO, ILLINOIS, ASSIGNOR TO UNIQUE SPARK PLUG CLEANER CO., OF CHICAGO, ILLINOIS, A CORPORATION OF ILLINOIS

SLACK-TAKE-UP DEVICE

Application filed January 27, 1927. Serial No. 163,905.

This application relates to slack take-up devices for tightening or loosening the brakes of a motor vehicle, and the present improvements are in the nature of an improvement on the structure shown and described and covered broadly in prior application No. 110,629, filed May 21, 1926.

Generally stated, the object of the invention is to provide a novel and improved construction whereby a hydraulic slack take-up device of this general character is advantageously applied to a brake of a particular type, in which the brake is adjacent the engine, as in motor vehicles of the so-called Ford type, a brake of this kind comprising a brake band on the drum immediately below the footboard, controlled by a foot pedal.

It is also an object to provide certain details and features of construction and combinations tending to increase the general efficiency and desirability of a hydraulic brake tightener or loosener of this particular character.

To the foregoing and other useful ends the invention consists in matters hereinafter set forth and claimed and shown in the accompanying drawings, in which—

Fig. 1 is a longitudinal sectional view of the dash and footboard section of a motor vehicle, showing the foot brake of the vehicle equipped with a hydraulic brake tightener or loosener embodying the principles of the invention.

Fig. 2 is an enlarged section on line 2—2 in Fig. 1.

Fig. 3 is a detail view.

As thus illustrated, the invention comprises a brake band 1 of any suitable character on the brake drum 2 immediately in rear of the engine 3, as is common in motor vehicles of a certain type. A cylinder 4 contains a plunger 5, the plunger rod 6 of which extends through the two end portions 7 and 8 of the brake band, having a nut 9 at the end thereof to exert a pull on the end portion 8 of the brake band. A spring 10 is interposed between the two end portions 7 and 8, in the form of a coil spring on the plunger rod 6, in the manner shown. A sleeve 11 is loosely mounted on the rod 6 and has the foot pedal 12 keyed thereto. The hub portion 13 of the foot pedal has cam engagement with a stationary portion 14 of the vehicle, so that forward motion of the pedal causes said cam engagement to cause lateral or axial movement of the pedal portion 13, in the well known manner, thereby to set the brake. For this purpose the cylinder 4 has its stuffing box 15 disposed in engagement with the end of the sleeve 11 and with the hub portion 3 of the foot pedal, whereby the lateral or axial movement of the sleeve 11 and the portion 13 will move the cylinder 4 axially to the left, in Fig. 2 of the drawings, and with oil or other liquid 16 in the cylinder between the head 5 and the stuffing box 15 of the cylinder 4, such axial movement of the latter will exert a pull on the rod 6 and thus set the brake.

The oil or other liquid 16 is fed to the cylinder through a pipe 17 leading from the controller on the dash, which controller comprises a stationary cylinder 18 fastened to the dash, and the plunger 19 therein, rotation of the handle 20 causing axial movement of the plunger, thereby forcing oil out of this controller cylinder 18 through the pipe 17 into the cylinder 4, causing the plunger 5 and its rod 6 to move to the left, in Fig. 2, causing a tightening of the brake. In this way, the driver, without stopping the vehicle and without rising from the seat, and without stooping over, can adjust the brake mechanism, and either tighten or loosen the brake at will. At the same time the foot pedal can be used to set the brake in the ordinary manner.

The hydraulic apparatus thus provided can be filled in any suitable or desirable manner, as by providing a filler 21 in the pipe connection between the controller and the take-up device. This filler may be of any suitable character, such as those ordinarily used on automobiles for engagement with the nozzle of the ordinary device by which lubricating oil is injected into some of the bearings on motor vehicles.

The slack take-up device, it will be seen, is so effective that it can even be used to set the brake, or to release the brake. But in practice the foot pedal is employed, preferably, to set or release the brake, and the hydraulic apparatus is merely adjusted from time to time to give the brake the degree of tightness which will insure the best results.

Thus the invention involves a band brake having a rod or other suitable connection between its two end portions, forming an axis for the foot pedal, in combination with means on the same axis for tightening and loosening the brake. Proferably, the controller for such mechanism is hydraulic in character, and is preferably located on the dash of the vehicle, but the tightening and loosening means mounted on the axis of the foot pedal, for tightening and loosening the brake, may be controlled by any suitable means without departing from the spirit of the invention.

Without disclaiming anything, and without prejudice to any novelty disclosed, what I claim as my invention is:—

1. The combination of a vehicle brake drum, a brake band thereon, a rod attached to one end portion of the brake band, a fixed element forming a guide for said rod, forming also a stop for the other end portion of the brake band, brake adjusting devices dependent upon said stop to produce a pull on said rod, to tighten the brake band on the drum, and a manual controller operable by the driver about a fixed axis while the vehicle is moving for operating said devices to tighten or loosen the brake at will.

2. A structure as specified in claim 1, in combination with means for mounting said controller on the dash of the vehicle, and for operatively connecting the controller to said devices.

3. A structure as specified in claim 1, comprising a foot pedal operative about said rod as an axis, having cam engagement with said fixed portion, to exert a pull on said rod to set the brake, said foot pedal being mounted on said rod between said fixed portion and said devices, and said fixed portion and the mounted portion of the foot pedal forming a thrust bearing for said devices when said controller is operated to tighten the brake.

4. In a motor vehicle, a brake drum and brake band thereon immediately in rear of the engine, a pedal mechanism for operating the brake band, adjusting means on said mechanism for tightening or loosening the brake band, and a controller operative about a fixed axis on the dash of the vehicle having operative connection with said adjusting means.

5. A structure as specified in claim 4, said pedal and adjusting means having a common axis extending through the end portions of the brake band.

6. A structure as specified in claim 4, said controller being operative through said adjusting means to set or release the brakes at will while the motor vehicle is in motion.

Specification signed this 21st day of January, 1927.

RAY H. FLOYD.